United States Patent
Alp et al.

(10) Patent No.: US 7,695,844 B2
(45) Date of Patent: *Apr. 13, 2010

(54) SYSTEM STABILITY IMPROVEMENTS TOLERATING INCREASED NITROGEN CROSS-OVER

(75) Inventors: Abdullah B. Alp, Rochester, NY (US); Joe Machuca, Rochester, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 1308 days.

This patent is subject to a terminal disclaimer.

(21) Appl. No.: 11/180,865

(22) Filed: Jul. 13, 2005

(65) Prior Publication Data

US 2007/0015017 A1    Jan. 18, 2007

(51) Int. Cl.
*H01M 8/04* (2006.01)

(52) U.S. Cl. .............. 429/34; 429/12; 429/13; 429/22

(58) Field of Classification Search .......... 429/34, 429/12, 13, 22
See application file for complete search history.

(56) References Cited

U.S. PATENT DOCUMENTS

| 2005/0214617 | A1 | 9/2005 | Chapman et al. |
| 2006/0099466 | A1 | 5/2006 | Wake et al. |
| 2006/0240309 | A1* | 10/2006 | Dehne .......... 429/38 |
| 2007/0009772 | A1* | 1/2007 | Iio .............. 429/13 |

* cited by examiner

*Primary Examiner*—Jane Rhee
(74) *Attorney, Agent, or Firm*—John A. Miller; Miller IP Group, PLC

(57) ABSTRACT

A control strategy for removing nitrogen from the anode side of a fuel cell stack. The control strategy includes using a bleed valve to remove the nitrogen during the operation of the fuel cell stack until the stack ages to a point where the bleed valve is maintained open, but the concentration of nitrogen in the anode side of the stack continues to increase. Once the concentration of nitrogen in the anode side increases to a predetermined level, then a purge valve is opened in combination with the bleed valve to reduce the concentration of nitrogen. Once the nitrogen concentration is reduced below the level, then both valves are closed, and the sequence is repeated.

16 Claims, 1 Drawing Sheet

SYSTEM STABILITY IMPROVEMENTS TOLERATING INCREASED NITROGEN CROSS-OVER

BACKGROUND OF THE INVENTION

1. Field of the Invention

This invention relates generally to a system and method for removing nitrogen from the anode side of a fuel cell stack and, more particularly, to a system and method for removing nitrogen from the anode side of a fuel cell stack that includes using both a bleed valve and a purge valve to remove the nitrogen.

2. Discussion of the Related Art

Hydrogen is a very attractive fuel because it is clean and can be used to efficiently produce electricity in a fuel cell. The automotive industry expends significant resources in the development of hydrogen fuel cells as a source of power for vehicles. Such vehicles would be more efficient and generate fewer emissions than today's vehicles employing internal combustion engines.

A hydrogen fuel cell is an electrochemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode. The work acts to operate the vehicle.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation. These conditions include proper water management and humidification, and control of catalyst poisoning constituents, such as carbon monoxide (CO).

Several fuel cells are typically combined in a fuel cell stack to generate the desired power. For example, a typical fuel cell stack for a vehicle may have two hundred or more stacked fuel cells. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack. The stack also includes flow channels through which a cooling fluid flows.

The fuel cell stack includes a series of flow field or bipolar plates positioned between the several MEAs in the stack. The bipolar plates include an anode side and a cathode side for adjacent fuel cells in the stack. Anode gas flow channels are provided on the anode side of the bipolar plates that allow the anode gas to flow to the anode side of the MEA. Cathode gas flow channels are provided on the cathode side of the bipolar plates that allow the cathode gas to flow to the cathode side of the MEA. The bipolar plates also include flow channels through which a cooling fluid flows.

The MEAs are porous and thus allow nitrogen in the air from the cathode side of the stack to permeate therethrough and collect in the anode side, referred to in the industry as nitrogen cross-over. Nitrogen in the anode side of the fuel cell stack dilutes the hydrogen such that if the nitrogen concentration increases beyond a certain percentage, such as 50%, the fuel cell stack becomes unstable and may fail.

It is known in the art to provide a bleed valve at the anode gas output of the fuel cell stack to remove nitrogen from the anode side. The bled hydrogen can be sent to any suitable location, such as a combustor or the cathode input to the stack. It is also known in the art to provide a purge valve at the anode gas output of the fuel cell stack to depressurize the anode side for rapid system shut-down and to reduce the pressure of the anode side if it significantly increases above the pressure of the cathode side. The purge valve is selectively opened because it creates a pressure drop between the cathode side and the anode side that could reduce the stack lifetime. The bleed valve has a much smaller orifice than the purge valve so that opening the bleed valve does not create a significant pressure difference between the anode side and the cathode side, which could reduce the life of the stack.

A control model is used to control the opening of the bleed valve during operation of the fuel cell stack to maintain the concentration of nitrogen below the certain percentage. As the fuel cell stack ages, the cross-over of nitrogen from the cathode side to the anode side increases as a result of degradation of the MEAs. The control model considers the increase of nitrogen cross-over, and controls the bleed valve accordingly to reduce the concentration of nitrogen in the anode side. However, eventually the fuel cell stack will age enough where maintaining the bleed valve in a constant open position will not remove enough of the nitrogen. Therefore, the fuel cell stack may fail as a result of dilution of the hydrogen. It is not desirable to provide a bleed valve having a larger orifice because the pressure drop created between the cathode side and the anode side when the bleed valve is open would also act to reduce the lifetime of the fuel cell stack.

SUMMARY OF THE INVENTION

In accordance with the teachings of the present invention, a control strategy is disclosed for removing nitrogen from the anode side of a fuel cell stack. The control strategy includes using a bleed valve to remove the nitrogen during operation of the fuel cell stack until the stack ages to a point where the bleed valve is maintained open, but the concentration of nitrogen in the anode side of the stack continues to increase. Once the concentration of nitrogen in the anode side increases to a predetermined level, then a purge valve is opened in combination with the bleed valve to reduce the concentration of nitrogen. Once the nitrogen concentration is reduced below the level, then both valves are closed, and the sequence is repeated until the pressure difference between the anode side and the cathode side of the stack created by opening the purge valve causes the fuel cell stack to fail.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a method for removing nitrogen from the anode side of a fuel cell stack is merely exemplary in nature, and is in no way intended to limit the invention or its applications or uses.

Figure 1:
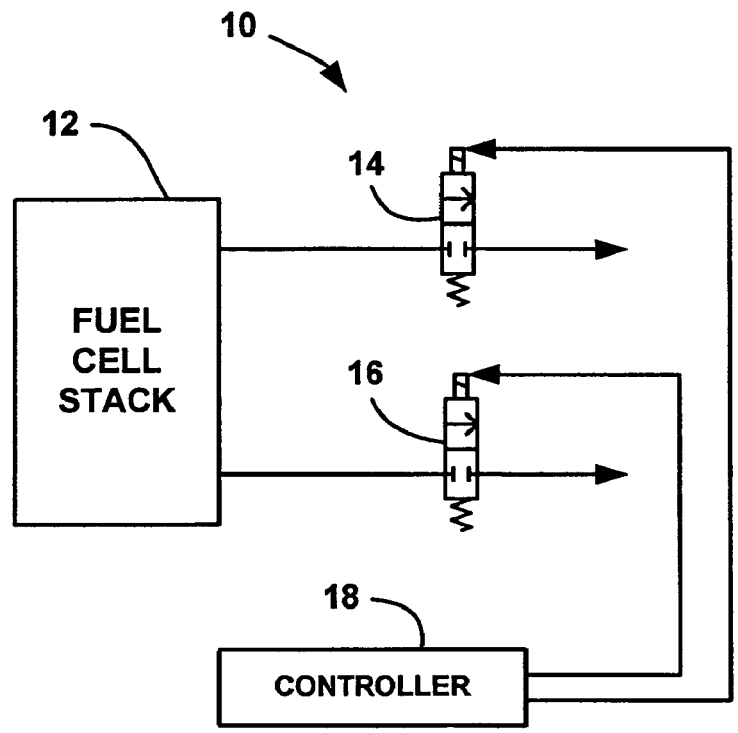
FIG. 1 is a block diagram of a fuel cell system including a technique for controlling a bleed valve and a purge valve for removing nitrogen from the anode side of a fuel cell stack, according to an embodiment of the present invention.

FIG. 1 is a block diagram of a fuel cell system 10 including a fuel cell stack 12. The fuel cell system 10 includes a bleed valve 14 for removing nitrogen from the anode side of the stack 12 and a purge valve 16 for providing a rapid depressurization of the anode side of the stack 12 for the purposes discussed above. The valves 14 and 16 are shown as electromagnetically controlled valves. However, any valve suitable for the purposes described herein can be used. The valves 14 and 16 are normally provided at an output side of the anode flow channels of the fuel cell stack 12. Although the valves 14 and 16 are depicted here in separate output lines from the fuel cell stack 12, their position within or relative to the fuel cell stack 12 would be determined by the design of the stack 12, as would be well understood to those skilled in the art.

A controller 18 controls the opening and closing of the bleed valve 14 to remove the nitrogen from the anode side of the fuel cell stack 12. As discussed above, a control model is used to periodically open the bleed valve 14 during operation of the fuel cell stack 12 based on its age. The controller 18 opens the purge valve 16 to quickly purge the anode side of the fuel cell stack 12 during a quick shut-down of the system 10, or for other anode side depressurization reasons.

According to the invention, the purge valve 16 is also used to remove nitrogen from the anode side of the fuel cell stack 12 during normal operation of the stack 12 when the bleed valve 14 is no longer able to remove the nitrogen fast enough. Particularly, when the fuel cell stack 12 reaches a predetermined age, the bleed valve 14 will be maintained in the open position, but the accumulation of the nitrogen in the anode side of the stack 12 will still increase.

Figure 2:
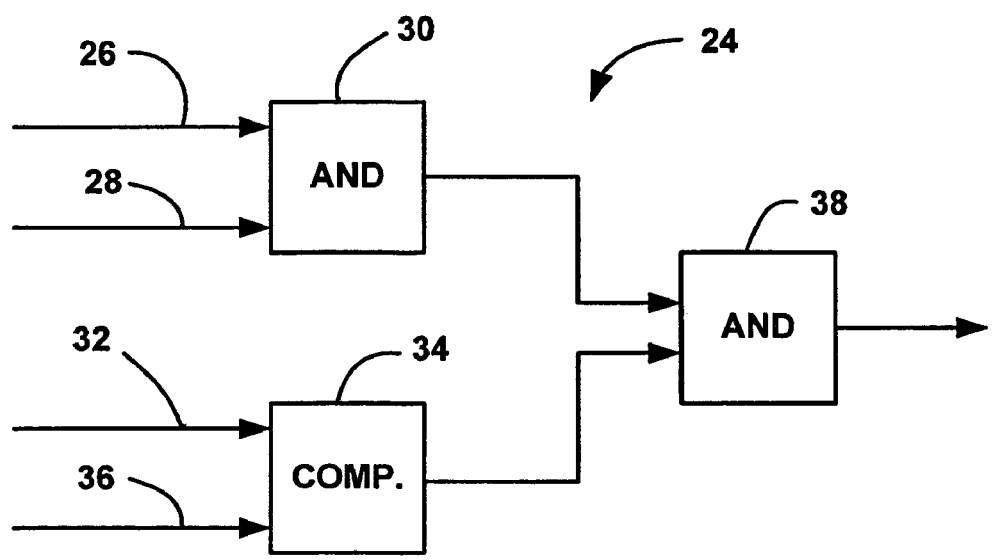
FIG. 2 is a plan view of the control strategy used for removing nitrogen from the anode side of the stack according to the invention.

FIG. 2 is a block diagram showing a control strategy of the invention to use the purge valve 16 in combination with the bleed valve 14 for removing nitrogen from the anode side of the fuel cell stack 12. The controller 18 provides a high signal on line 26 when the bleed valve 14 is open. Additionally, the controller 18 provides a high signal on line 28 to request that the bleed valve 14 be opened because the nitrogen level is still too high. The signals on the lines 26 and 28 are applied to an AND gate 30, or other suitable device. If the bleed valve 14 is open and the controller 18 also requests that the bleed valve 14 be opened because not enough nitrogen is being removed from the anode side, then the AND gate 30 outputs a high signal.

The controller 18 also provides a signal on line 32 to a comparator 34 indicative of the percentage of nitrogen in the anode side of the fuel cell stack 12. The percentage is based on the system model as discussed above, depending on the age of the stack 12, how often the bleed valve 14 has been opened and other factors. A line 36 is hardwired to a predetermined percentage that represents a maximum allowable amount of nitrogen in the anode side of the fuel cell stack 12 above which will cause the stack 12 to be unstable. The predetermined percentage is based on the particular stack design, and probably will be in the range of 40%-60%. When the percentage of the nitrogen in the anode side of the fuel cell stack 12 provided on the line 32 increases to or above the set percentage on the line 36, then the output of the comparator 34 goes high.

The outputs from the AND gate 30 and the comparator 34 are applied to an AND gate 38. When both of the inputs to the AND gate 38 are high, the output of the AND gate 38 goes high, which causes the controller 18 to open the purge valve 16 to remove the nitrogen. Once the concentration of nitrogen in the anode side of the fuel cell stack 12 decreases below the predetermined percentage on the line 32, then the output to the AND gate 38 goes low, which causes the controller 18 to close the purge valve 16. The bleed valve 14 is also closed because the request on the line 28 will also go low. This sequence is repeated as the concentration of nitrogen within the anode side of the fuel cell stack 12 increases again.

Using the purge valve 16 to remove hydrogen from the anode side does create a substantial pressure drop across the MEAs, which reduces the life of the MEAs. However, by the time the purge valve 16 is needed to help remove the nitrogen, the stack 12 is already near the end of its life. Using the purge valve 16 to help remove the nitrogen may have the benefit of providing a few more hours of stack life to prevent the vehicle operator from being stranded, sometimes referred to as limp home. Also, by using the purge valve 16 for this purpose, extra components are not needed to increase the life of the fuel cell stack 12 in response to nitrogen cross-over.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell system comprising:
   a fuel cell stack;
   a bleed valve for bleeding nitrogen from an anode side of the fuel cell stack;
   a purge valve for depressurizing the anode side of the fuel cell stack; and
   a controller for controlling the operation of the bleed valve and the purge valve, said controller opening and closing the bleed valve to remove the nitrogen from the anode side of the fuel cell stack until the bleed valve is maintained in an open position and the nitrogen in the anode side of the fuel cell stack accumulates above a predetermined percentage, said controller then opening the purge valve to remove the nitrogen from the anode side of the fuel cell stack.

2. The fuel cell system according to claim 1 wherein the controller closes both the bleed valve and the purge valve after the purge valve is opened to remove the nitrogen and when the percentage of the nitrogen in the anode side falls below the predetermined percentage.

3. The fuel cell system according to claim 1 wherein the controller uses a model to determine when to open and close the bleed valve and when to use the purge valve to help remove the nitrogen.

4. The fuel cell system according to claim 3 wherein the model uses the age of the fuel cell stack.

5. The fuel cell system according to claim 1 wherein the bleed valve has a smaller valve orifice than the purge valve.

6. The fuel cell system according to claim 1 wherein the predetermined percentage is 40%-60%.

7. The fuel cell system according to claim 1 wherein the fuel cell system is on a vehicle.

8. A fuel cell system for a vehicle, said system comprising:
a fuel cell stack;
a bleed valve for bleeding nitrogen from an anode side of the fuel cell stack;
a purge valve for depressurizing the anode side of the fuel cell stack; and
a controller for controlling the operation of the bleed valve and the purge valve, said controller opening and closing the bleed valve to remove the nitrogen from the anode side of the fuel cell stack until the bleed valve is maintained in an open position and the nitrogen in the anode side of the fuel cell stack accumulates above a predetermined percentage, said controller then opening the purge valve to remove the nitrogen from the anode side of the fuel cell stack, wherein the controller closes both the bleed valve and the purge valve after the purge valve is opened to remove the nitrogen and when the percentage of the nitrogen in the anode side falls below the predetermined percentage, and wherein the controller uses a model to determine when to open and close the bleed valve and when to use the purge valve to help remove the nitrogen.

9. The fuel cell system according to claim 8 wherein the predetermined percentage is 40%-60%.

10. The fuel cell system according to claim 8 wherein the model uses the age of the fuel cell stack.

11. The fuel cell system according to claim 8 wherein the bleed valve has a smaller valve orifice than the purge valve.

12. A method for removing nitrogen from an anode side of a fuel cell stack, said method comprising:
using a bleed valve to remove the nitrogen from the anode side of the fuel cell stack; and
using a purge valve to help remove the nitrogen from the anode side of the fuel cell stack using a purge valve to help remove the nitrogen from the anode side of the fuel cell stack in combination with the bleed valve in order to remove the nitrogen form the anode side of the fuel cell stack and using a controller for controlling the operation of the bleed valve and the purge valve, said controller opening and closing the bleed valve to remove the nitrogen from the anode side of the fuel cell stack until the bleed valve is maintained in an open position and the nitrogen in the anode side of the fuel cell stack accumulates above a predetermined percentage, the controller than opening the purge valve to remove the nitrogen from the anode side of the fuel cell stack.

13. The method according to claim 12 wherein the predetermined percentage is 40%-60%.

14. The method according to claim 12 further comprising using a model to determine when to open and close the bleed valve and when to use the purge valve to help remove the nitrogen.

15. The method according to claim 14 wherein the model uses the age of the fuel cell stack.

16. The method according to claim 12 wherein the fuel cell stack is part of a fuel cell engine on a vehicle.

\* \* \* \* \*